United States Patent [19]
Yano et al.

[11] Patent Number: 5,351,940
[45] Date of Patent: Oct. 4, 1994

[54] VIBRATION DAMPING MATERIAL

[75] Inventors: Kunihiko Yano, Saitama; Takahiro Niwa, Kanagawa; Seiji Sakurada, Nara, all of Japan

[73] Assignee: Nichias Corporation, Tokyo, Japan

[21] Appl. No.: 964,429

[22] Filed: Oct. 21, 1992

[30] Foreign Application Priority Data

Oct. 30, 1991 [JP] Japan .................. 3-311736

[51] Int. Cl.$^5$ .................................. F16F 1/36
[52] U.S. Cl. .......................... 267/153; 267/292
[58] Field of Search .............. 267/30, 35, 49, 50, 267/292, 294, 151, 152, 153, 160

[56] References Cited

U.S. PATENT DOCUMENTS

| | | | |
|---|---|---|---|
| 2,735,672 | 2/1956 | Bradley | 267/49 |
| 3,022,062 | 2/1962 | Kemp | 267/49 |
| 3,103,348 | 4/1963 | Paulsen | 267/294 X |
| 3,193,049 | 7/1965 | Wollek | 181/33 |
| 3,311,331 | 3/1967 | Steimen | 267/294 X |
| 4,086,388 | 4/1978 | Brown | 428/315 |
| 4,720,088 | 1/1988 | Tamura | 267/160 X |
| 4,852,704 | 8/1989 | Brockenbrough et al. | 267/36.1 X |
| 4,958,812 | 9/1990 | Wolf et al. | 267/294 |
| 5,102,107 | 4/1992 | Simon et al. | 267/30 X |

FOREIGN PATENT DOCUMENTS

| | | |
|---|---|---|
| 54-077679 | 6/1979 | Japan . |
| 63-057659 | 3/1988 | Japan . |
| 4-049031 | 2/1992 | Japan . |
| 2000571 | 1/1979 | United Kingdom . |

Primary Examiner—Andres Kashnikow
Assistant Examiner—Lee W. Young
Attorney, Agent, or Firm—Flynn, Thiel, Boutell & Tanis

[57] ABSTRACT

A vibration damping material represents a high vibration damping property (loss factor $\eta$) in a plurality of temperature ranges. A viscoelastic material layer between two constraining plates or between a constraining plate and a vibrating body is in the form of a bubble-contained adhesive layer containing bubbles. Near the glass transitional point (Tg), the bubble-contained adhesive layer is changed from a glass status to a rubber status and represents a first peak of the loss factor. In a temperature range above Tg, a second peak of the loss factor appears by virtue of consumption of vibration energy caused by friction at the interface between air bubbles and polymer attendant to expansion and contraction. That is, peaks of the loss factor appear at two temperatures, and the temperature dependency is decreased.

6 Claims, 5 Drawing Sheets

VIBRATION DAMPING MATERIAL

BACKGROUND OF THE INVENTION

1. Field of the Invention

This invention relates to an improvement of a composite type vibration damping material made up of a constraining plate and a viscoelastic material layer laminated on a plate surface of the constraining plate.

2. Description of the Prior Art

Heretofore, composite type vibration damping materials made by using a thin steel plate as a constraining plate and by providing a viscoelastic material layer of rubber, resin or other material on a surface of the constraining plate have been used in various industrial fields. The composite type vibration damping material have been intended to absorb vibrations by virtue of the "dynamic viscoelastic behavior" of the viscoelastic material. From a structural viewpoint, they are roughly divided into two types: a free-layer type made by providing a viscoelastic material layer 2 on a plate surface of a vibrating body 4 as shown in FIG. 7; and a constrained type made by sandwiching a viscoelastic material layer 2 between a vibrating body 4 and a constraining plate 1 or between two constraining plates 1 as shown in FIG. 8. The former absorbs vibrations by converting vibration energy into thermal energy as a result of tension-compression deformation of the viscoelastic material layer. The latter absorbs vibrations by converting vibration energy into thermal energy mainly as a result of shear deformation.

The composite type vibration damping material, either of the free-layer type or of the constrained type, has a viscoelastic characteristic inherent to the viscoelastic material layer. It is considered most serious drawbacks of the composite type vibration damping material that the vibration damping property (loss factor) has a sharp peak near the glass transitional temperature, and that the temperature range for sufficient performance of the vibration damping property is very narrow, which means its dependency on temperature is great.

Heretofore, the following three approaches have been proposed for reducing the temperature dependency of the composite type vibration damping materials:

(a) Mixture of Filler

Fine powder of mica, graphite, magnesium silicate used as a filler is mixed with a viscoelastic material to increase the surface area of a constraining surface causing the shear deformation and increase the energy converting amount, thereby changing the shape of the loss factor with temperature from a peaked shape to a divergent (broad) shape.

(b) Polymer Alloy

Mixed different kinds of polymers are phase-separated to cause respective phases to share their peculiar glass transitional points to produce a plurality of peak temperatures in the loss factor.

(c) Lamination of Different Kinds of Polymers

A mechanical-structural polymer composite body is made.

These approaches, however, have problems indicated below.

With the approach (a), although the temperature dependency of the loss factor is usually decreased by mixture of a filler, the loss factor at the peak temperature tends to become relatively low. Moreover, the farther from the peak temperature, the lower is the loss factor. Therefore, this approach does not perform a high loss factor in a plurality of temperature ranges.

With the approach (b), since effect by phase separation is not always obtained from arbitrary combination of polymers, particular consideration on mixture of polymers is required for insuring phase separation, and a difficulty in such mixture arises. Moreover, phase separation usually invites a decrease in cohesive force of polymers.

With the approach (c), Young's modulus of each polymer must be taken into consideration upon laminating polymers. Arbitrary combination of polymers does not always provide a high loss factor in a plurality of temperature ranges desired. Moreover, consideration on adhesiveness between polymers is also required, and the manufacturing process is divided into a plurality of steps, which causes an increase of the manufacturing cost.

OBJECT OF THE INVENTION

It is therefore an object of the invention to provide a vibration damping material that is maintained to include a single phase of polymer, which is stable, and has a high loss factor in a plurality of temperature ranges required, without laminating different kinds of polymers, which results in an excellent loss factor in a wide range of temperature.

SUMMARY OF THE INVENTION

The invention lies in a constrained type vibration damping material in which a viscoelastic material layer for absorbing vibrations is made of bubble-contained pressure sensitive adhesive.

In the aforementioned vibration damping material, a first peak is produced in the loss factor near the glass transitional point of the pressure sensitive adhesive, and a second loss factor peak is produced near the temperature range above the glass transitional point by virtue of consumption of vibration energy caused by friction at the interface between bubbles and polymer attendant to expansion and contraction of the bubbles.

DETAILED DESCRIPTION OF THE PREFERRED EMBODIMENT

Figure 1:
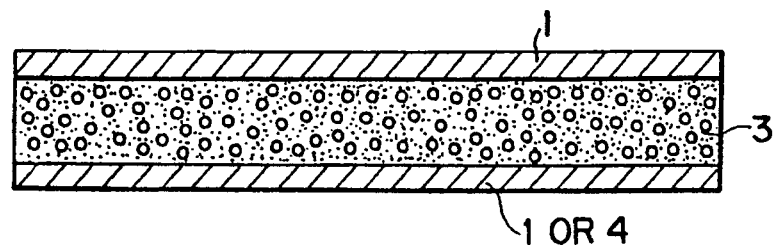
FIG. 1 is a schematic structural diagram of a constrained type vibration damping material embodying the invention.

FIG. 1 schematically shows structure of a constrained type vibration damping material as an embodiment of the invention. In the drawing, reference numeral 1 refers to a constraining plate, 3 to a viscoelastic material layer made of bubble-contained pressure sensitive adhesive, and 4 to a vibrating body.

A metal plate such as iron plate (cold-rolled steel plate), aluminum plate, stainless steel plate, copper plate, and so forth, or a plate material from the ceramic industry such as calcium silicate plate, slate plate, plaster board, and so on, may be used as the constraining plate forming the vibration damping material.

It is recommendable to use an acrylic pressure sensitive adhesive as the pressure sensitive adhesive which is a basic material of the bubble-contained pressure sensitive adhesive. Also usable are rubber-based, silicon-based, acetic acid vinyl-based, EVA-based, urethane, vinyl ether-based, nitrile rubber-based, neoprene-based material. In order for the pressure sensitive adhesive to contain bubbles, there are, for example, a method of agitating the pressure sensitive adhesive so that bubbles automatically enter therein, a method of adding a foaming agent to the pressure sensitive adhesive to generate thermal decompositional gas, a method of thermally expanding a microcapsule, and a method of spreading the pressure sensitive adhesive on a porous surface and apply heat to generate bubbles in the pressure sensitive adhesive on the porous surface. A pore rate in the range of 5% to 80% and a pore diameter in the range of 10 to 300 μm are preferable for the bubble-contained pressure sensitive adhesive.

Figure 2A:
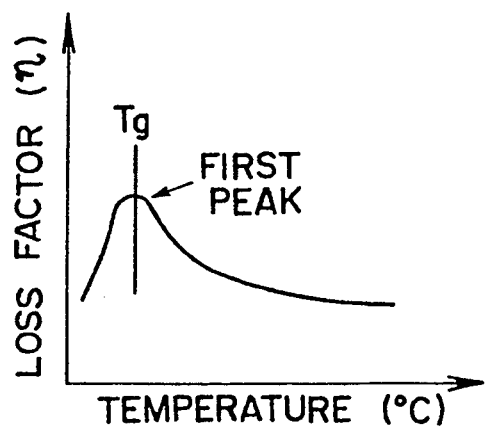
FIG. 2a and 2b present graphs each showing vibration damping properties (loss factors) of an existing vibration damping material and the vibration damping material according to the invention, in which: (a) shows changes in loss factor with temperature in the existing vibration damping material; and (b) shows changes in loss factor with temperature in the vibration damping material according to the invention.
Figure 2B:
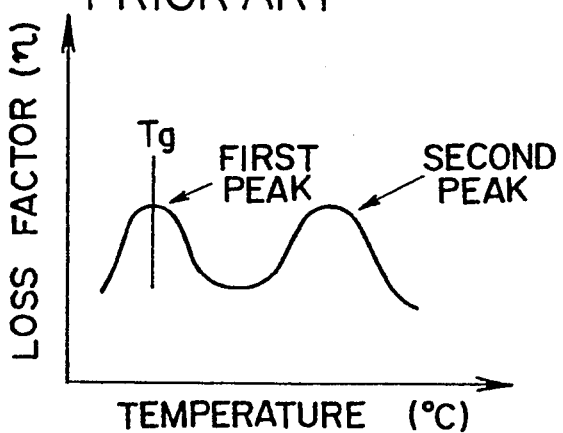

With the vibration damping material whose viscoelastic material layer is made of a bubble-contained pressure sensitive adhesive, as shown in a graph of FIG. 2(b), the pressure sensitive adhesive layer is changed from a glass status to a rubber status near the glass transitional point (Tg), where a first peak of the loss factor (η) appears. With an increase in temperature above the transitional point, the pressure sensitive adhesive is changed to a rubber status in which bubbles can readily expand or contract. As a result, with vibration applied, the bubbles are deformed to oval shapes via the pressure sensitive adhesive existing in the rubber status region, or repeat expansion and contraction while, in contrast, causing contraction and expansion of the pressure sensitive adhesive. Due to friction produced thereby at the interface of the pressure sensitive adhesive and the bubbles or between respective bubbles, the vibration is converted to heat and absorbed, which causes a second peak of the loss factor to appear. A graph of FIG. 3(b) shows changes in Young's modulus (rate of elasticity) occurring thereupon. The Young's modulus (E) is changed in two steps in response to the second peak of the loss factor. When the temperature increases after the second peak appears, the inner pressure of a bubble exceeds the cohesive force of the pressure sensitive adhesive. Then the bubbles begin expansion, and friction at the interface of the pressure sensitive adhesive and the bubbles decreases. Therefore, since the pressure damping material cannot convert the vibration energy to frictional heat (energy), η decreases rapidly.

Figure 3A:
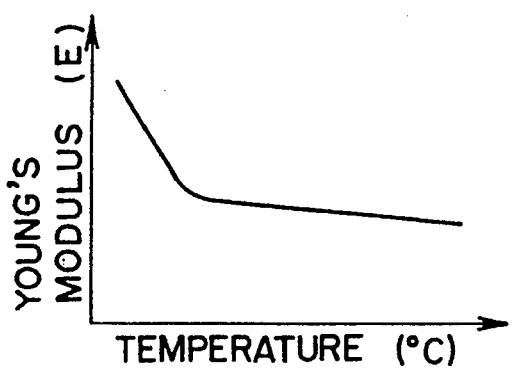
FIG. 3a and 3b present graphs showing Young's moduli of the existing vibration damping material and the vibration damping material according to the invention, in which: (a) shows a graph showing changes in Young's modulus with temperature in the existing composite vibration damping material; and (b) shows changes in Young's modulus with temperature in the composite vibration damping material according to the invention.
Figure 3B:
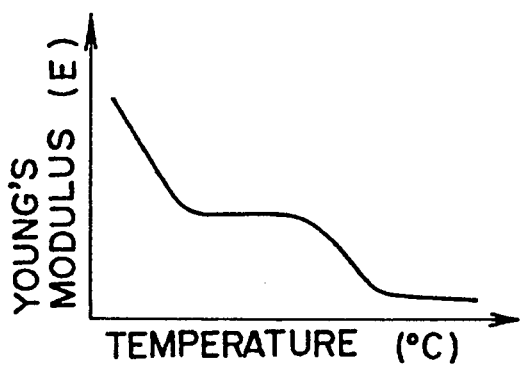

Graphs of FIG. 2(a) and FIG. 3(a) show characteristics of loss factor and Young's modulus of an existing vibration damping material in comparison with FIG. 2(b) and FIG. 3(b).

Next explanation is directed to an experimental embodiment of the invention.

Figure 4:
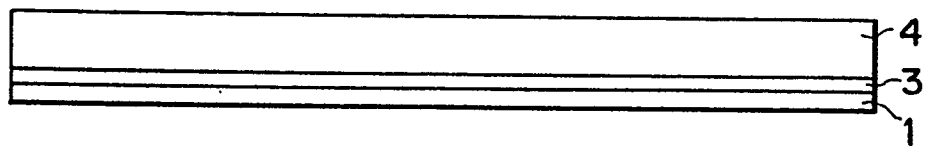
FIG. 4 is a side elevation of the vibration damping material embodying the invention.

In this embodiment, as shown in FIG. 4, a 0.6 mm thick cold-rolled steel plate is used as the constraining plate 1. Between the constraining plate 1 and a vibrating plate 4 in the form of a 3.00 mm thick steel plate is laminated a 0.1 mm thick film-like bubble-contained pressure sensitive adhesive made by providing bubbles in an acrylic pressure sensitive adhesive.

Upon preparing the lamination, after the respective elements are laminated in sequence, tension is applied to opposite ends of the respective elements so as to remove undesirable matters such as buckling or blister, and the elements are then bonded together by a hot press at the temperature of 50° C.

A structure having a pressure sensitive adhesive without bubbles in lieu of the bubble-contained pressure sensitive adhesive 3 in the foregoing experimental embodiment was taken as a comparative example.

Vibration damping property was tested by a mechanical impedance method to measure the loss factor. Young's modulus obtained is Young's modulus of a composite body, which was calculated from a resonant frequency obtained upon measurement of the loss factor. It is therefore different from Young's modulus of the pressure sensitive adhesive itself.

Figure 5:
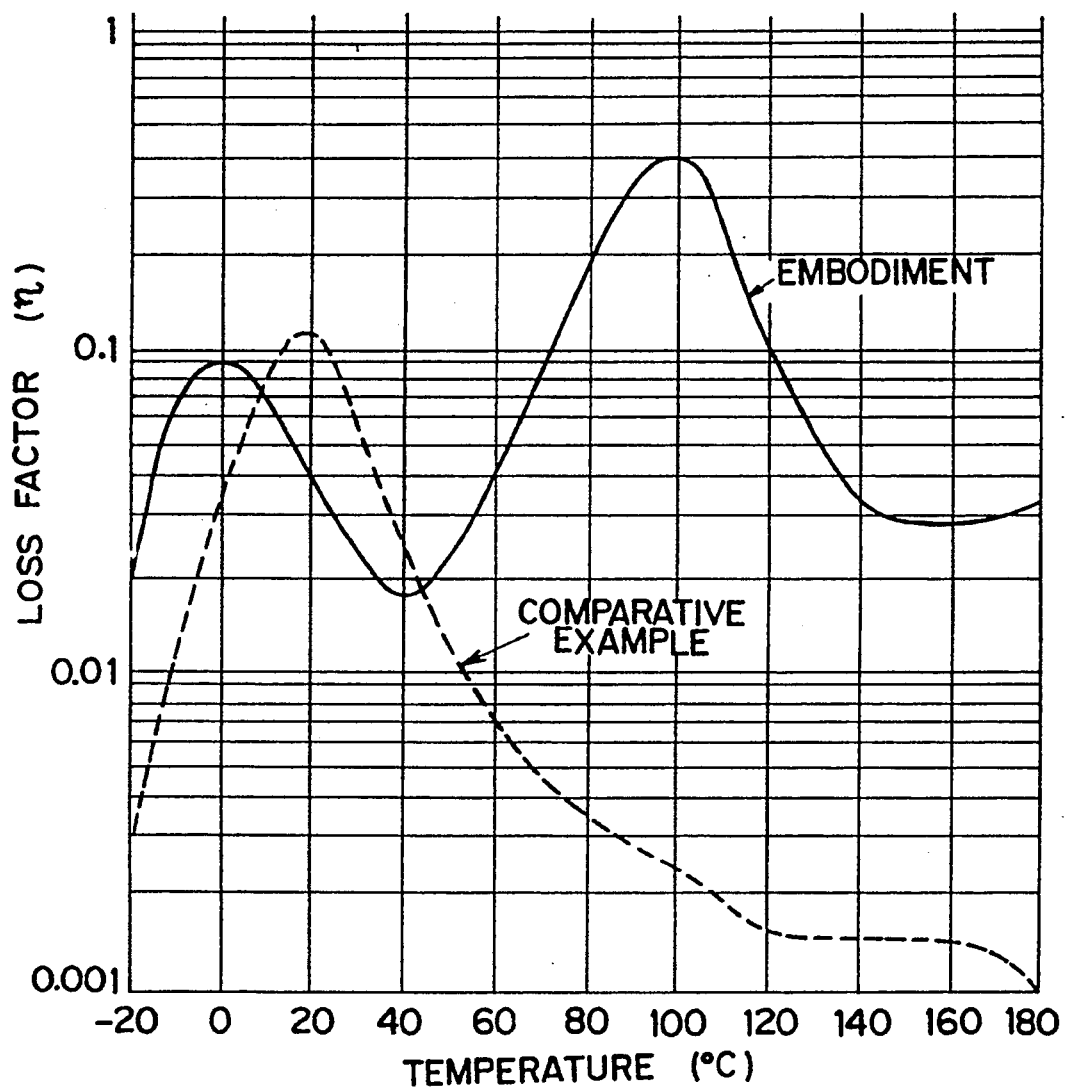
FIG. 5 is a graph showing temperature characteristics of vibration damping properties (loss factors) by the embodiment and a comparative example.

A graph of FIG. 5 shows vibration damping properties (temperature characteristics) of vibration damping materials by the foregoing experimental embodiment and the comparative example. A graph of FIG. 6 shows changes in Young's modulus (temperature characteristics) of the composite body.

As shogun in the graph of FIG. 5, vibration damping property of the foregoing embodiment is such that, in addition to a peak (3° C.) of the loss factor near the glass transitional point of the bubble-contained pressure sensitive adhesive, a second peak appears near 98° C., and the temperature dependency is decreased. In contrast, in the comparative example, although a peak of the loss factor appears at the glass transitional point of the pressure sensitive adhesive, the loss factor decreases as it goes to the high temperature range. That is, the temperature dependency is high.

Figure 6:
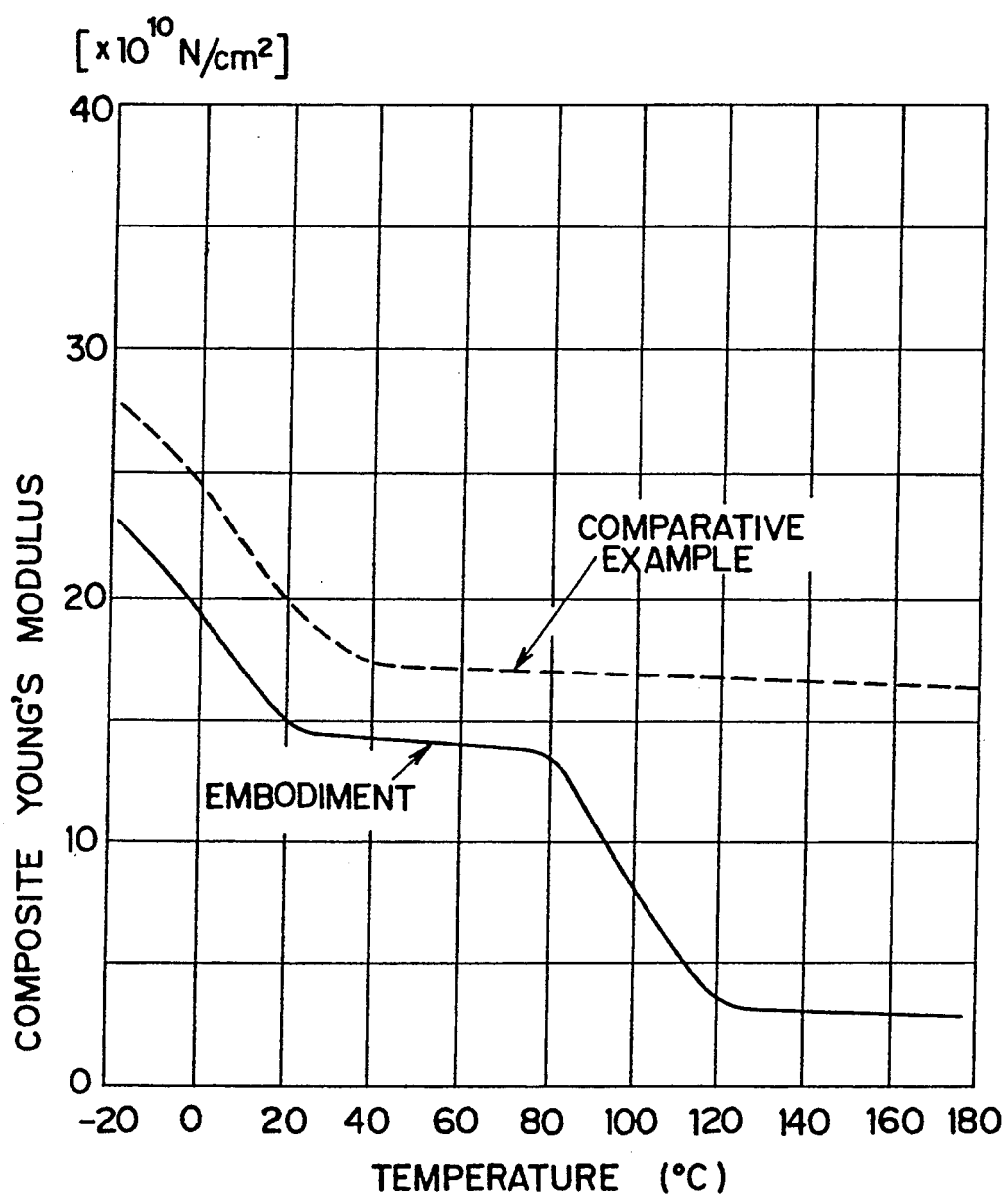
FIG. 6 is a graph showing changes in Young's moduli of composite vibration damping materials according to the embodiment and the comparative example.
Figure 7:
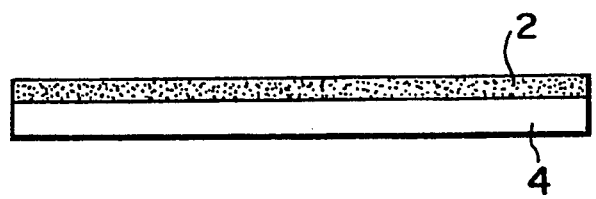
FIG. 7 is a structural diagram of an existing free-layer type vibration damping material.
Figure 8:
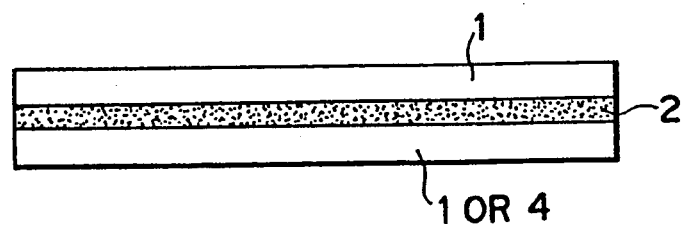
FIG. 8 is a structural diagram of an existing constrained type vibration damping material.

On the other hand, Young's modulus of the composite body according to the embodiment, as shown in the graph of FIG. 6, represents a two-step change (from 14 to $3.5 \times 10^{10}$ N/m²). The comparative example, however, represents a one-step change.

Result of the foregoing vibration damping property test is shown in the following table 1:

TABLE 1

| | first peak | | second peak | |
|---|---|---|---|---|
| | temperature °C. | loss factor | temperature °C. | loss factor |
| embodiment | 3 | 0.09 | 98 | 0.40 |

TABLE 1-continued

|  | first peak | | second peak | |
|---|---|---|---|---|
|  | temperature °C. | loss factor | temperature °C. | loss factor |
| comparative example | 19 | 0.11 | — | — |

According to the invention, while maintaining polymer is in a single phase which is stable and not laminating different kinds of polymers, a vibration damping material having an excellent loss factor in a wide temperature range, with peaks of the loss factor in a plurality of temperatures, can be obtained.

Let the vibration damping material according to the invention be used for preventing, for example, a squeal noise caused by coupled oscillation of a disk braking system of a car. Then its effect is maximized when used as a squeal noise preventing vibration damping material (braking system) in which the temperature at the back of the brake pad ranges from −10° to 30° C. upon starting and ranges from 80° to 120° C. in normal use.

What is claimed is:

1. In a composite type vibration damping material which includes a constraining plate having a surface thereon, and a vibration-absorbing viscoelastic material layer laminated on said surface of said constraining plate, the improvement comprising wherein said viscoelastic material layer is a pressure sensitive adhesive layer which is a stable single phase of polymer containing a number of bubbles having a pore rate in the range of 5% to 80% and having a pore diameter in the range of 10 to 300 μm, so that a high vibration damping characteristic having two peaks at substantially different temperatures is obtained, a first of said peaks being at a glass transitional temperature, and a second of said peaks being at a temperature higher than said glass transitional temperature and being due to consumption of vibration energy through friction at an interface between said bubbles and said polymer attendant to expansion and contraction of said bubbles.

2. A composite type vibration damping material according to claim 1, wherein said viscoelastic material layer has a thickness which is approximately 0.1 mm.

3. A composite type vibration damping material according to claim 1, wherein said pressure sensitive adhesive layer is an acrylic pressure sensitive adhesive.

4. In a composite type vibration damping material which includes at least two constraining plates and a vibration-absorbing viscoelastic material layer disposed between said constraining plates, the improvement comprising wherein said viscoelastic material layer is a pressure sensitive adhesive layer which is a stable single phase of polymer containing a number of bubbles having a pore rate in the range of 5% to 80% and having a pore diameter in the range of 10 to 300 μm, so that a vibration damping characteristic having two peaks at substantially different temperatures is obtained, a first of said peaks being at a glass transitional temperature, and a second of said peaks being at a temperature higher than said glass transitional temperature and being due to consumption of vibration energy through friction at an interface between said bubbles and said polymer attendant to expansion and contraction of said bubbles.

5. A composite type vibration damping material according to claim 4, wherein said viscoelastic material layer has a thickness which is approximately 0.1 mm.

6. A composite type vibration damping material according to claim 4, wherein said pressure sensitive adhesive layer is an acrylic pressure sensitive adhesive.

* * * * *